United States Patent
Dakhil (10) Patent No.: US 9,537,368 B2
(45) Date of Patent: Jan. 3, 2017

(54) MAGNETIC POWER GENERATOR FOR HYBRID VEHICLE AND/OR ELECTRIC POWER PLANT

(71) Applicant: Farouk Dakhil, Rome (IT)

(72) Inventor: Farouk Dakhil, Rome (IT)

(*) Notice: Subject to any disclaimer, the term of this patent is extended or adjusted under 35 U.S.C. 154(b) by 170 days.

(21) Appl. No.: 14/168,378

(22) Filed: Jan. 30, 2014

(65) Prior Publication Data
US 2015/0214795 A1    Jul. 30, 2015

(51) Int. Cl.
| | | |
|---|---|---|
| *H02K 1/27* | (2006.01) | |
| *H02K 7/06* | (2006.01) | |
| *H02K 7/18* | (2006.01) | |
| *B82Y 15/00* | (2011.01) | |
| *H02K 53/00* | (2006.01) | |

(52) U.S. Cl.
CPC ............. *H02K 7/06* (2013.01); *H02K 7/1807* (2013.01); *B82Y 15/00* (2013.01); *H02K 53/00* (2013.01); *Y10S 74/09* (2013.01); *Y10S 322/00* (2013.01); *Y10S 977/948* (2013.01)

(58) Field of Classification Search
CPC ...... H02K 1/2746; H02K 7/06; H02K 7/1807; H02K 53/00; H02K 7/1869; H02K 7/1876; H02K 7/1884; H02N 2/183; Y10S 74/09
USPC .......................... 290/1 R, 50; 310/12.01, 311
See application file for complete search history.

(56) References Cited

U.S. PATENT DOCUMENTS

| | | | | | |
|---|---|---|---|---|---|
| 3,327,142 | A | * | 6/1967 | Elwood .................... | G01K 7/22 310/344 |
| 3,539,841 | A | * | 11/1970 | Riff ......................... | H02N 2/18 123/642 |
| 3,992,132 | A | * | 11/1976 | Putt .......................... | F04B 1/04 310/103 |
| 5,055,725 | A | * | 10/1991 | LaSota .................... | H02K 7/06 310/12.27 |
| 6,002,184 | A | * | 12/1999 | Delson ................... | H02K 23/00 273/148 R |
| 7,288,860 | B2 | * | 10/2007 | Cheung ................... | H02K 35/02 290/1 R |
| 8,410,667 | B2 | * | 4/2013 | Rastegar .................. | F03G 7/08 310/339 |
| 2007/0210659 | A1 | * | 9/2007 | Long ...................... | H02K 49/10 310/80 |
| 2007/0284956 | A1 | * | 12/2007 | Petrovich ................. | H02K 7/06 310/80 |
| 2008/0036308 | A1 | * | 2/2008 | Schlesinger ........... | H02K 33/16 310/26 |
| 2009/0152990 | A1 | * | 6/2009 | Brown ..................... | F03G 5/06 310/339 |
| 2010/0187835 | A1 | * | 7/2010 | Hohlfeld ............... | B81B 3/0021 290/1 R |
| 2010/0244457 | A1 | * | 9/2010 | Bhat ..................... | B60G 13/14 290/1 A |

(Continued)

*Primary Examiner* — Viet Nguyen
(74) *Attorney, Agent, or Firm* — Maier & Maier, PLLC (57) ABSTRACT

A magnetic generator may be disclosed. The magnetic generator may include one or more permanent magnets which may function in one or more ways in combination with a dielectric elastomer to efficiently produce electricity. Electricity may be produced directly by the magnets, through mechanical means as driven by the magnets, by piezoelectric means, or as desired to maintain peak efficiency. Further, systems to retain excess energy for later use, such as a flywheel or a battery may be employed.

11 Claims, 9 Drawing Sheets

(56) References Cited

U.S. PATENT DOCUMENTS

| | | | |
|---|---|---|---|
| 2010/0289346 A1* | 11/2010 | Pepin | H02K 33/16 |
| | | | 310/15 |
| 2011/0074162 A1* | 3/2011 | Cottone | H01L 41/125 |
| | | | 290/1 R |
| 2014/0097708 A1* | 4/2014 | Simcox | H02K 33/02 |
| | | | 310/24 |
| 2014/0117786 A1* | 5/2014 | Gosvener | H02K 7/075 |
| | | | 310/23 |
| 2014/0152134 A1* | 6/2014 | Heo | H02K 21/00 |
| | | | 310/152 |

* cited by examiner

MAGNETIC POWER GENERATOR FOR HYBRID VEHICLE AND/OR ELECTRIC POWER PLANT

BACKGROUND

The emission of pollutants due to industry and automobiles such as smog-causing sulphur compounds, carbon dioxide, carbon monoxide, and nitrogen oxides has caused ever-increasing problems including health hazards and global warming that are becoming the world's most dangerous and preoccupying matters. In addition, the rapid increase in the demand for automobiles in the Asian market, which has doubled in the last four years, requires an urgent solution. The Earth's population is continuously increasing, requiring more energy and putting pressure on the world community to find reliable and clean solutions for these problems.

Part of the difficulty in addressing the above-mention problems is that there is no comprehensive solution which encompasses the whole cycle of energy production, starting from a non-polluting renewable energy source and continuing to the end user. For example, cars with increasingly-popular electrical motors, fuel-cell, or hybrid engines do not solve the problem because they still rely for the most part on the power plant that would supply the required energy to charge the batteries for the electrical cars or to produce hydrogen, in the case of fuel-cells, from natural gas, etc.

There is a need for a cost-effective, safe, and efficient clean energy production solution which can be implemented using current engineering principles and manufactured without overburdening complexity.

SUMMARY

According to at least one exemplary embodiment, a magnetic generator may be disclosed. The magnetic generator may include one or more permanent magnets which may function in one or more ways in combination with a dielectric elastomer to efficiently produce electricity. Further, systems to retain excess energy for later use, such as a flywheel or a battery may be employed.

BRIEF DESCRIPTION OF THE FIGURES

Advantages of embodiments of the present invention will be apparent from the following detailed description of the exemplary embodiments. The following detailed description should be considered in conjunction with the accompanying figures in which.

Exemplary

DETAILED DESCRIPTION

Aspects of the invention are disclosed in the following description and related drawings directed to specific embodiments of the invention. Alternate embodiments may be devised without departing from the spirit or the scope of the invention. Additionally, well-known elements of exemplary embodiments of the invention will not be described in detail or will be omitted so as not to obscure the relevant details of the invention. Further, to facilitate an understanding of the description discussion of several terms used herein follows.

As used herein, the word "exemplary" means "serving as an example, instance or illustration." The embodiments described herein are not limiting, but rather are exemplary only. It should be understood that the described embodiment are not necessarily to be construed as preferred or advantageous over other embodiments. Moreover, the terms "embodiments of the invention", "embodiments" or "invention" do not require that all embodiments of the invention include the discussed feature, advantage or mode of operation.

According to at least one exemplary embodiment, a magnetic generator may be disclosed. The magnetic generator may include one or more permanent magnets which may function in one or more ways in combination with a dielectric elastomer to efficiently produce electricity. Further, systems to retain excess energy for later use, such as a flywheel or a battery may be employed.

Figure 1:
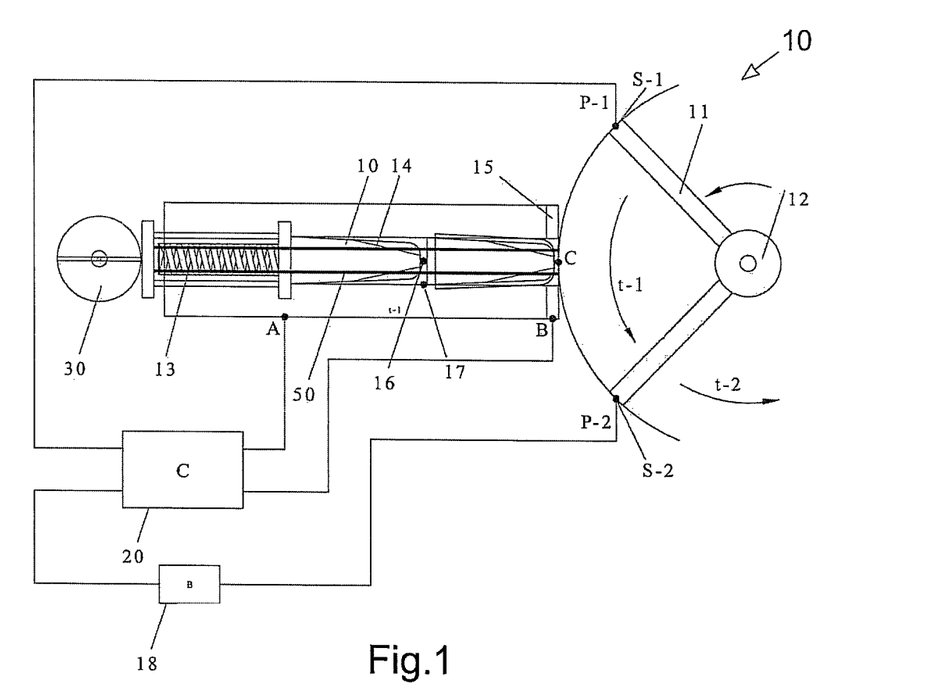
FIG. 1 shows a detailed arrangement of a first embodiment of a magnetic generator mechanism Exemplary

Referring to exemplary FIG. 1, a magnetic generator mechanism (10) may consist of a permanent magnetic cone-formed magnet directed towards a blade (11) which functions as a free rotating blade. Blade 11 may be made of natural permanent magnetic material, or as desired. There may be a plurality of such natural permanent magnets (10) and blades (11) placed in parallel as shown in exemplary FIG. 5, and as described below. For clarity FIG. 1 shows only one permanent magnet arrangement 10 with one blade 11. Magnet 10 and magnetic blade 11 may be positioned with equal poles directed toward one another in order to produce a repulsion force between said tow magnets.

Magnet (10) may be placed in this embodiment in such a way that its magnetic equal (+ve or −ve pole) force is substantially directed at magnetic blade 11. There may be a point in time in which the two magnets 10 and 11 reach nearer to one another, referred to as the "point of incident" (PI). PI is the point in time when magnet 10 and magnetic blade 11 come near enough to one another in order to repel one another and thus blade 11 may continue to rotate and magnet 10 may be pushed back. Once blade 11 passes a critical point P, the magnetic force of magnets 10 may drive blade 11 by repulsion in an anti-clock-wise direction. Thus the force of repulsion between the two magnets may also push back the linearly moving magnet 10 to its original position.

Magnet (10) may be engineered substantially in the shape of a cone in order to concentrate the magnetic field's force on blade 11 into a small area of concentration directed substantially onto the center of the top of blade 11's equal pole.

Blade 11 may be welded to a metal shaft (12) which may rotate in a circular motion as the blades set in motion by the force of the magnetic field exerted by the permanent magnet 10 upon blade 11. Around the central shaft there may be a stator (generative coil housing) which may produce electricity as shaft 12 rotates inside this stator. The magnetic shaft may be welded to said blades substantially at the center of this electromagnetic assembly or embodiment.

The magnetic repulsive force received by magnet 10 may be substantially equivalent to the force in a spring 13, so that magnet 10 may be able to reach its initial position A when spring 13 is completely compressed and bar 16 emerges from underneath to block magnet 10 for its next movement towards blade 11 once it passes point P. The moment of release of magnet 10 may be controlled by a central electronic unit 20 such that the two magnets would meet at the PI only to generate useful work. For example, said blade may be pushed by the magnetic repulsion force of magnet 10 and blade 11 would repel magnet 10 backward towards its original position.

Further, magnet 10 may be placed on a sliding rail platform (14) on which magnet 10 may move forward and backward from position A (when spring 13 may be compressed) to B (when spring 13 may be released). The magnetic field of magnet 10 may be shielded from effecting blade 11 before it reaches position P2 by a magnetic shielding material (MSM) 15. MSM 15 may be, for example, carbon nanotubes, or as desired. Additionally, magnet 10 may be pulled away to a distance at which no opposite magnetic field forces between the two magnets (10 and 11) is exerted on each other. This shielding and removing at a distance may help prevent blade 11 being turned backward in a clockwise rotation, which may be counterproductive. Magnet 10 may be placed on a sliding rail platform (14) along which the magnet 10 may be pulled backward and forward by a spring or pneumatic piston (13) and come substantially to a halt by a vertically moving finger-like aluminum bar (16). Bar 16 may be positioned underneath platform 14 in such a way that when magnet 10 has reached a position to exert its force on magnetic blade 11 aluminum bar 16 may come out at position A. Position B may correspond to the position of the sliding magnet 10 at which magnet 10 exerts its maximum "useful" repulsion force upon magnetic blade 11. Bar 16 may be connected to a sensor 17 which may allow bar 16 to emerge from a predisposed slot-cavity within platform 14 to block magnet 10 at its front end side in order to block magnet 10 in its position and keep spring 13 compressed until the next time when blade 11 has reached position P1, at which time sensor 17 may pull down bar 16 and release magnet 10 to shoot towards magnet blade 11.

There may be sensors, S1 and S2, each placed at critical positions, P1 and P2. The sensors would signal for each magnet the critical position of blade 11. Once blade 11 has reached P1 magnet 10 may be released by spring 13 and as magnet blade 11 reaches position P2, magnet 10 and blade 11 may repel one another in such a way that blade 11 rotates or continues its rotation and at the same time magnet 10 is repulsed backwards compressing spring 13 to its original position. Sensor 17 may signal the "retreat" from position B to its initial position A and magnet 10 may be blocked in this position by bar 16. Position P2 may be the position where magnet blade 11 would reach after having been repulsed by the maximum repulsion force from magnet 10 and simultaneously pushing magnet 10 to its original position A.

Further, the repulsion force on magnet 10 may compress spring 13 to its initial compressed position and work is done on spring 13. The work done by the repulsion between magnet 10 and blade 11 and the resulting braking energy may then be stored in a flywheel (30) as shall be shown in FIG. 2 and described below. Thus substantially all braking forces and the work (energy) done by magnet 10 in this system may be transmitted to flywheel 30 for storage and eventually rebooting the system from stored electrical power inside the flywheel or from an external battery 18. Thus blade 11 may then receive only the repulsion or "push-force" from magnet 10 to continue its rotations in one direction at all times. The use of a flywheel as a storage mechanism and its application is known in the art.

The whole system may be controlled and wired by an overall electronic central unit 20 which also controls other components of this device.

Further, magnetic shielding material (15) may be placed to "protect" magnetic blade 11 from most counter and opposite magnetic force produced by the magnet 10 before blade 11 has reached its critical position P2, where the repulsion force of magnet 10 may be directed toward the rotation (anti-clockwise) of blade 11.

Additionally, all other components around the magnets 10 and 11 may be constructed of a material which is diamagnetic and not attracted by the magnets. Such a material may be aluminum or carbon alloys which are very hard and resistant also to corrosion, or as desired.

Battery 18 may supply the energy needed for a rebooting of the system or for sensors 17 and central controlling electronic device 20 which coordinates the functions of the whole system. According to one non-limiting example, the system would work in such a way that magnet 10 would move along line AB, ensuring maximum magnetic force on blade 11 at the right moment in time as controlled by sensor 17. Also, magnet 10 may be slightly inclined towards the position of blade 11 to focus its magnetic force "laser-like shuts" onto rotating blade 11.

The sensors may be programmed by software in such a way that the movement of magnet 10 may be coordinated and substantially synchronic to blade 11 to receive the maximum amount of magnetic repulsion or push to continue its angular revolution on its axis 12. Such sensitive software program systems are well known to those skilled in the art. After an initial repulsive "push," blade 11 may continue to move in its circular movement at ever higher velocities as controlled by hardware device 20.

A plurality of this arrangement of magnetic system-devices may be connected in series on different shafts as desired. The magnetic blades may move freely around a fixed axis at the middle of the blades assembly. The blades may be placed in a vacuum to ensure minimum air resistance and maximum electrical energy output. The permanent magnets may be natural super magnet(s) 10 having a substantially conical form with their points directed toward the blades. The natural magnets 10 may repulse the blade(s) 11 and cause them to rotate in an opposite direction and in such a way such that shaft 12 to which the blade is coupled may also rotate.

Figure 2:
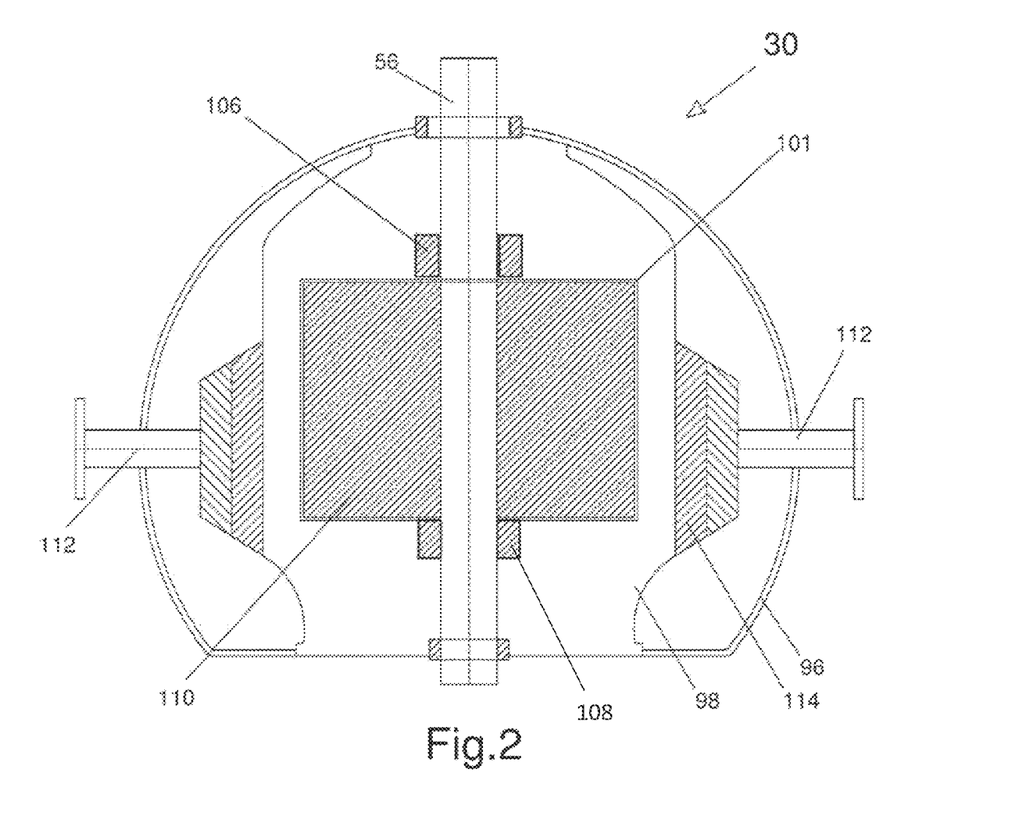
FIG. 2 shows a flywheel arrangement Exemplary

The system may need to be rebooted from energy already stored in flywheel 30 or from additional power in the battery and/or an additional generator in a vehicle or with a conventional power plant. Further, to decrease the loss of energy due to air resistance, all or part of the system may be placed in a vacuum. Additionally, a recycling coolant or water radiator (not shown) may ensure low temperatures and reduce frictional heat produced by the blade circular movement and may assist in obtaining higher speeds and efficiency.

The rotary-shaft 12 may be embedded in a magnetic field or connected to a variable transmission system (not shown) to generate electricity. Preferably, the parts around the natural permanent magnets may be made of a non-magnetic material, for example aluminum, or as desired.

Figure 1A:
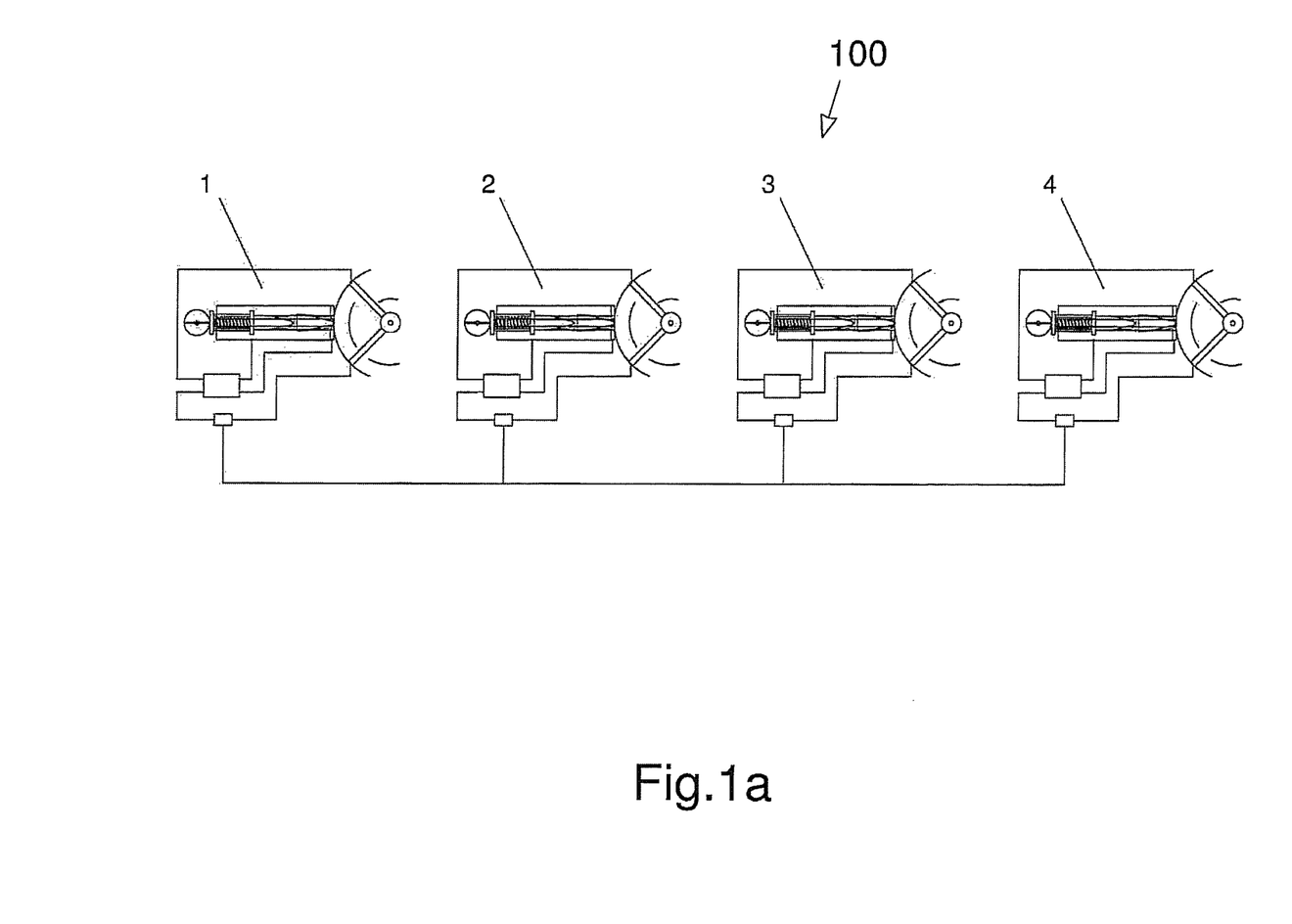
FIG. 1a shows a plurality of device arrangements for the magnetic generator mechanism Exemplary

Exemplary FIG. 1a shows a plurality of devices as shown in FIG. 1 and described above in a parallel arrangement, which may be used to generate greater levels of electricity.

Now referring to exemplary FIG. 2, flywheel 30 may work by absorbing bursts of energy and storing it to be released at a steady and constant flow whenever needed. A known use of flywheels is to store energy from intermittent sources of power.

Flywheel 30 may include a containment vessel 96 and a frame 98. Frame 98 may further contain a rotor 101. Frame 98 may be fastened to containment vessel 96 in at least locations substantially at opposite ends of containment vessel 96 proximate to where shaft 56 passes through containment vessel 96. Containment vessel 96 may be preferably made of a strong and lightweight material, for example a carbon fiber polymer composite, or as desired.

Shaft 56 may pass through frame 98 and containment vessel 96. To assist with minimizing friction with the rotor, magnets may be suspended in a magnetic field. Support structures 106 and 108 may support shaft 56 relative to frame 98. Rotor 101 may be fixed on shaft 56 and contained within a cavity 110 of frame 98. Further, rotor 101 may be made to rotate in a magnetic field.

Flywheel 30 may be fastened to an encasement at attachment pedestals 112. A somewhat flexible intermediate layer 114 may be fastened between frame 98 and pedestals 112. Layer 114 may provide isolation between the frame and rotor and the rest of present arrangement, and may be constructed of rubber, or as desired.

The use of a flywheel as in an embodiment of the present invention may provide one of several advantages. First, in a car utilizing a combustion engine, the combustion engine may be smaller and lighter due to a flywheel's ability to take over energy needs for start-ups, accelerations and driving up a hill. Further an electric car and/or fuel cell driven vehicle generally requires large and very heavy batteries, which may be eliminated with the proposed system.

Figure 3:
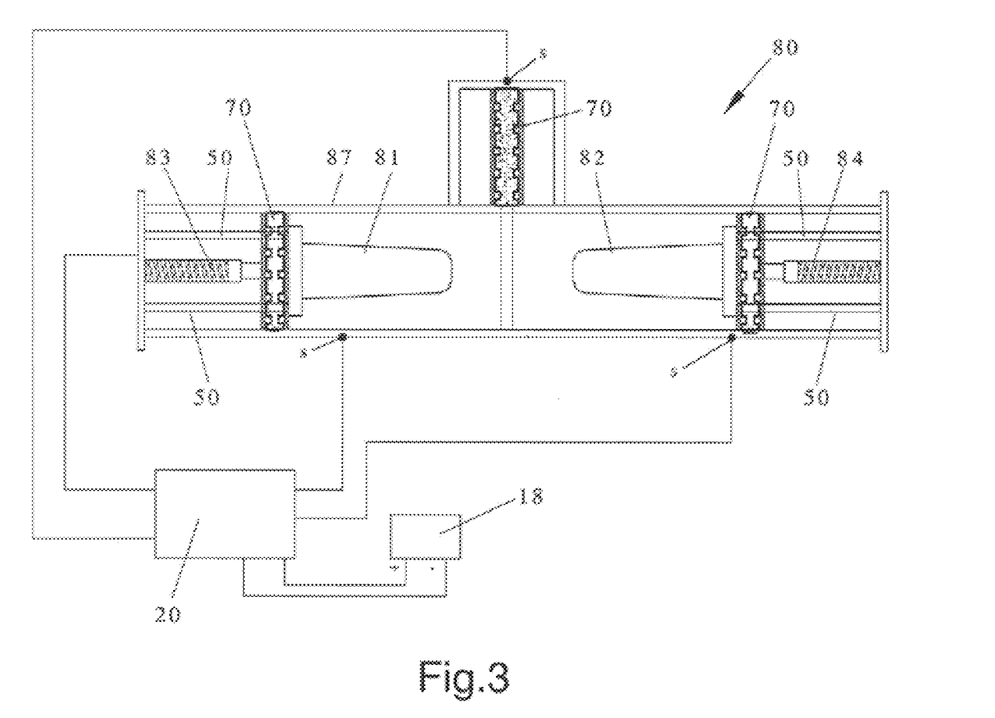
FIG. 3 shows a repulsive magnet assembly in a compressed configuration Exemplary
Figure 4:
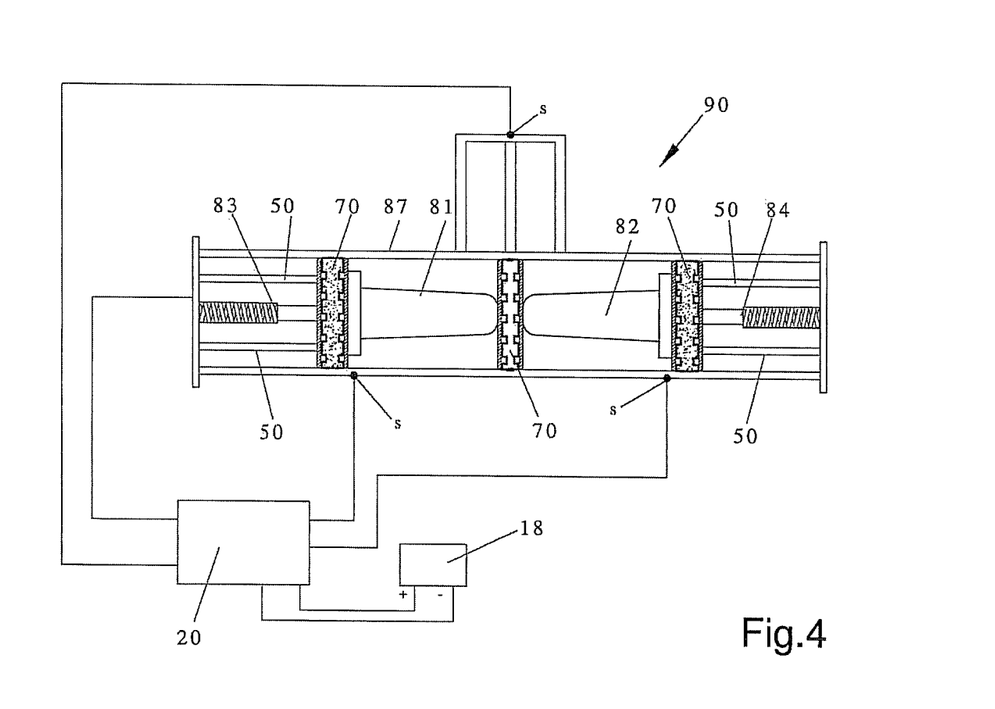
FIG. 4 shows the repulsive magnet assembly in an uncompressed configuration Exemplary

Referring now to exemplary FIGS. 3 and 4, a repulsive magnet assembly may use the magnetic forces of two natural permanents (81/82) in an arrangement as shown. The two magnets may be placed with their equal poles (positive or negative) against one another to create a repulsion force. Pistons (83, 84) may be coupled to the end of each permanent magnet 81/82 such that they may be compressed due to the repulsion force by each magnet. The repulsion of magnets 81/82 may push the magnets away from each other, thereby compressing pistons 83/84 to a predetermined maximum point. Inside pistons 83/84 there may be springs which may then be released to push back magnets 81/82 substantially to their initial position. The movement and release of the springs may be controlled by sensors. Pistons 83/84 may be placed on railways 50 which may ensure the movements of pistons 83/84 and the movements of magnets 81/82 remain in a substantially straight line. Said movements of magnets 81/82 and pistons 83/84 on said railways may create heat by friction which could, if high enough, bring a highly conductive thermal oil into a turbine (not shown) in order to generate electricity. Further there may be included dielectric elastomer (DE) cushions 70. A cushion may be pushed along rails 50 by sensor S (through a mechanism not shown) to shield the magnetic repulsive flux caused by magnets 81/82 and may allow the two magnets to reach their original/initial position, since their repulsion forced is decreased to minimum due to the MSM 15.

When magnets 81/82 return substantially to their initial position due to the spring force of the two magnets, the walls of cushion 70 may push against one another deforming the DE material inside which is sandwiched in a flexible coated non-paramagnetic but current-conductive material that forms the electrodes of the N-P junction plates, exerting a pressure on said DE material and thus generating a current which may then be fed to a battery 18. Once the magnets 81/82 are substantially in their initial position with the shielding wall of cushion 70 in between, sensor S may then pull back the barrier wall of cushion 70, allowing the two magnets to repel one another and press back pistons 83/84 respectively, creating a cycle of continuous movement of pistons and magnets moving backward and forward, which may furnish useful work which can be applied in many different applications. Device 90 may thus furnish an electrical and a mechanical (piston 83/84) power supply which may have an edge over other devices which are only electrical or only mechanical.

The dielectric elastomer (DE) layer can additionally be made of multiple layers to increase power generation.

Figure 5:
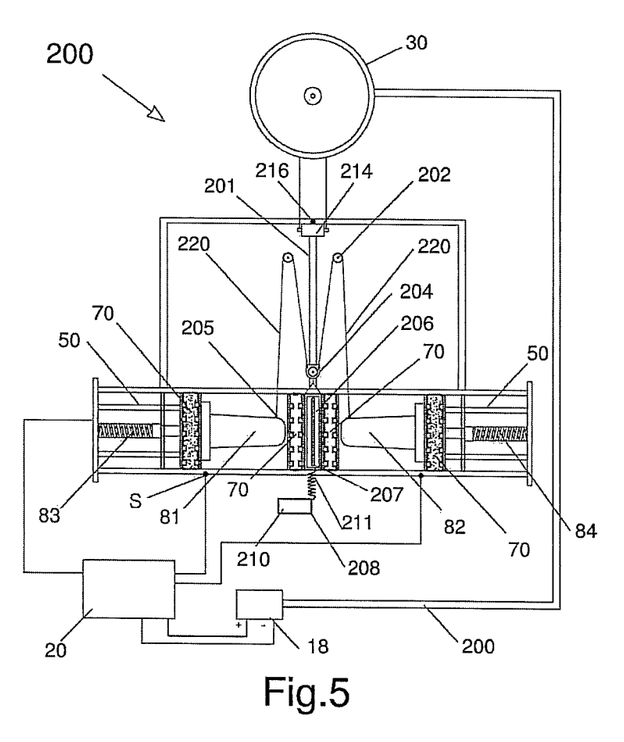
FIG. 5 shows a second embodiment of a magnetic generator mechanism Exemplary

Referring now to exemplary FIG. 5, a second embodiment of a magnetic power generator 200 may utilize at least two neodym magnets to produce electrical power to be stored in a flywheel and or a battery.

A high temperature superconducting type II ceramic material (SC Type II), such as YBCO, or as desired, may be used to shield the neodym magnets once they near one another. In one non-limiting example, SC material at the temperature of liquid nitrogen may be used because it may have the desired and necessary effect required due to it being magnetically shielding and diamagnetic. The SC ceramic material may be placed inside a hermetically closed container 208 filled with liquid nitrogen to ensure superconductivity. Said container may be connected to a cold finger 211. Cold finger 211 may be a flexible, low temperature-resistant tube which supplies liquid nitrogen from a cooling machine 210. Cooling machine may have sensors to keep the nitrogen at $-195°$ C. or 77 Kelvin. Said cold finger 211 may be flexible so that it can accommodate the up and down movement of separation wall 206 in which the liquid nitrogen is placed.

Magnets 81, 82 may be placed near one another with a separation wall in between so as to repel one another once the separation wall may be lifted by an electric motor 214. The magnets thus may be repelled from one another until the two pistons 83 and 84 are substantially compressed. Pistons 83 and 84 may then be released and the magnets may be forced to compress DE material at the separation wall 206. The mechanical work produced by the repulsion forces of the two equal poles of magnets 81 and 82 may compress and decompress the DE material at the end of the pistons 83 and 84 as well, protecting the SC material inside wall 206.

Thereafter, said separation wall 206 may be composed of two multilayer DE materials 70 and the high temperature type II super conducting material SC; the SC ceramic material may be placed inside a hermetically closed container 208 filled with liquid nitrogen to ensure superconductivity.

Said separation wall 206 may then be placed between the two magnets in such a way that it can be pulled up vertically by electric motor 214. Said separation wall 206 may fall between the two magnets creating the desired magnetic "shielding" effect as described above.

Each magnet may be attached to a carbon fiber-reinforced polymer or graphite fiber 205 and a pulley/winch 202/204 mechanism. As the repulsion forces of the magnetic fields interact and push the two magnets backward, the magnets may substantially simultaneously pull up the separation wall which may be lifted vertically as the two magnets move away from each other. Sensors 216 and electric motor 214 may ensure the pulling of the separation wall 206 at all times. In particular, sensors 216 and motor 214 may lift the wall when the two magnets reach one another, having been pushed by the two pistons and having bounced back and the resistance upon the wall 206 may be minimal. This moment in time may be referred to as the moment of incident (MOI) or moment of least resistance upon the separation wall 206 by the colliding two magnets. After, the two magnets may then be pushed back by their own repulsion forces in the absence of the separation wall 206 once it is lifted upward. Once the pistons start moving the two magnets back substantially into their original position, that is close to one another, the wall, as controlled by the sensors and electronic control unit 98, may drop down under its own gravitational weight to shield the magnets approaching each other. At the MOI said separation wall 206 may be pulled up again so that the magnets may bounce back at the separation wall and multilayer DE material; and thus the two magnets can repel one another freely and allow the start of an oscillation forward and backward in a smooth movement until friction and air-resistance etc. bring the two magnets to a near standstill. After slowing sufficiently, the system may need to be rebooted as controlled by the sensors and the main control electronic unit 98. Rebooting the system may involve using the pistons to move the magnets to substantially their original position near one another and the separation wall 206 may be down and between the magnets. This rebooting may be done by the electrical motor energy stored in battery 18, supplied externally, from power stored in a flywheel, or as desired.

Electric motor 214 may have an extra length of carbon fiber polymer robes 201 which may allow separation wall 206 to drop down (under its own weight), substantially immediately when pistons 83 and 84 have reached maximum compression and just before releasing their forces to push back magnets 81, 82 toward said separation wall 206. Said release by electric motor 214 may be controlled by sensors 216 and part of the software inside electronic control unit 20. This controlled action may allow the magnets to approach one another without counter resistance of their reciprocal magnetic repulsive forces as they near one another. Electric motor 214 may be placed substantially above the system to ensure the movement of separation wall 206 at the MOI and at the moment of releasing said wall to drop down under its own wait. Minimum electric power may be required because the main force of lifting the wall 206 is created by the repulsion force of magnets 81 and 82 as they repel one another and move backward at which time they substantially simultaneously lift said separation wall 206.

Flywheel 30 may be placed within this system assembly to store produced electric power by compressed and uncompressed DE material and/or any unused work done by the oscillation mechanism device at all times and in particularly during braking. Flywheel 30 may also provide power for the system when energy is necessary to reboot the system, for example, to bring back the two magnets in their original position close to one another as the separation wall is down in order to exert their repulsion forces and thereby restart the oscillation. However, due to friction and air resistance within the embodiment, the necessary energy to reboot the system may at some time be supplied by an external source, such as a battery 18 or a source to recharge the battery whenever needed. Preferably, an external supply of energy may be available whenever necessary such that at all times the magnets may be brought back to their close position with the separation wall in between the magnets, thereby rebooting the system. To reduce the external energy needed for the rebooting of the system and increase its efficiency friction may be reduced by using a lubricant, for example a nanomicro structure lubricant, or as desired. Additionally, the entire system may be encapsulated in a vacuum to reduce air resistance.

The electrical current produced by the compression and decompression of the DE elements may also be conducted to battery 18. The power stored in the flywheel 30 and in the battery may eventually provide electrical energy for any external device application such as a hybrid car or a power plant, but also may supply power for electric control device 20 for the coordination of the movements of magnets.

The flywheel may ensure maximum and efficient force transmission to the speed transmission system and rebooting the system in case of loss of oscillation due to friction and other counter forces like aerodynamics. The flywheel may be accelerated to a maximum when the magnetic device is decelerated and hence storing most of this energy in the flywheel during this idle time. The demands for peak power thus may be supplied by the flywheel and not by the magnetic device in order to avoid the long stalling problem of conventional electromagnetic motors. For this reason the flywheel may be necessary to start up the motion of a hybrid vehicle.

Pistons 83 and 84 may be special pneumatic pistons that may be compressed to a maximum before they release their compressed force. As the two magnets draw back their repulsion force would decrease as well until they reach the total compression of the pistons that would then push them back toward the separation wall. The energy used for the lifting of the wall may be partially compensated for by its gravitational fall and thereby also pulling the magnets toward said separation wall. Besides the flywheel, power that is needed to be stored for longer periods of time may be stored in a battery.

Further the pistons may have valves which can release their compressed force only at the end of its total compression. The use of vales with pistons may reduce resistance to the flow of fluid inside the piston and can improve its efficiency. Pneumatically operated pistons with valves used as pneumatic cannons which are very powerful but also usually require being controlled to the millisecond when it releases its compressed air are known in the art.

In addition, it may be possible to capture the heat produced by the system due to friction, air resistance and braking by encapsulating the surrounding of the magnets by a nonmagnetic, diamagnetic and heat resistant material in such a way that the generated heat can be drawn by a coolant like molten salt that is then conducted to boil water in order to turn a vapor turbine to generate electricity.

Figure 5A:
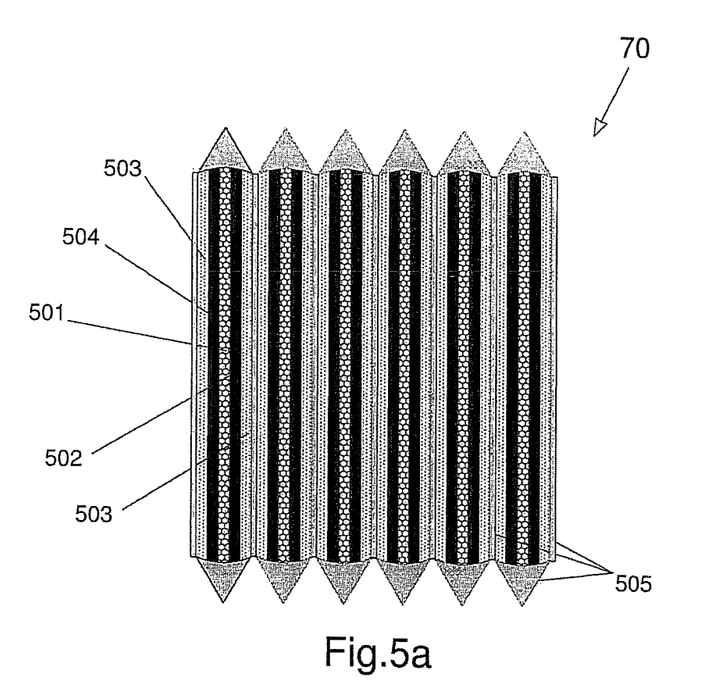
FIG. 5a shows an interior cross-section of a multi-layer DE cushion Exemplary

Now referring to exemplary FIG. 5a, a multilayer cushion 70 may be composed of 6 layers of DE material 501 which may be sandwiched inside two electrodes 502 and 504, and insulated by polymer material 503. Further, another elastic carbon reinforced rubber 505 may be used to ensure protection of DE material inside and in the two electrodes. This cushion may be elastic and robust such that it would resist the frequent impacts of the two oscillating magnets 81 and 82, as shown in exemplary FIG. 5 and described above.

Having a multilayer embodiment as shown here may increase the amount of current generated and thus the overall power generation of the device. Each layer of DE material may be sandwiched in a P-N junction 502/504 to transmit the produced current to a battery (not shown) and/or directly to where the electrical power is needed. Further, the P-N junction may be inserted within an insulating material 503 on both sides. Also, each layer may be protected by an elastic material 505 which may to absorb the pressure, and may be made of rubber, or as desired.

Figure 6:
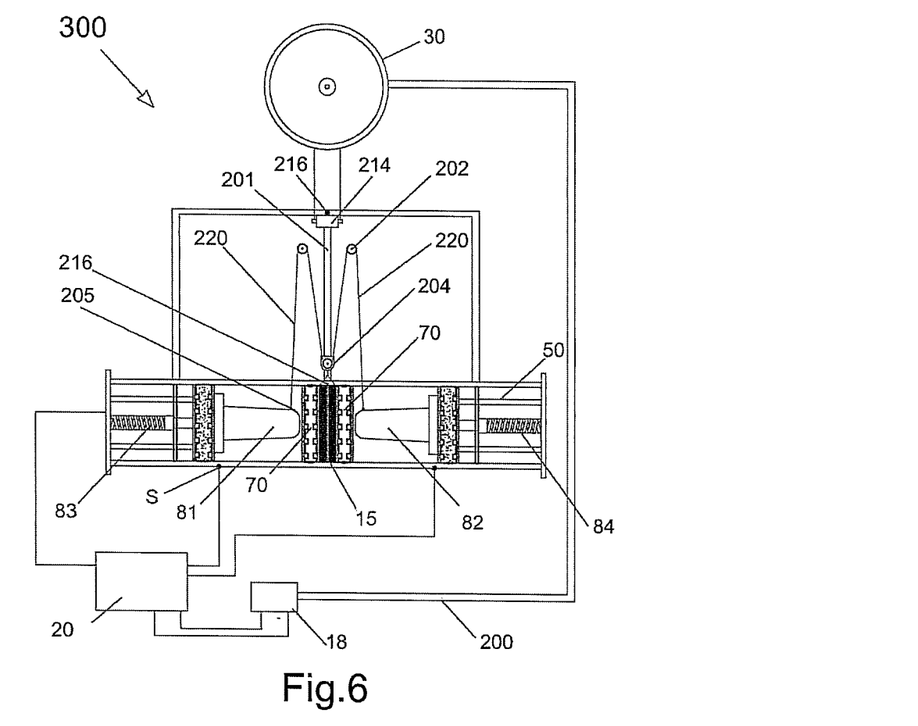
FIG. 6 shows a third embodiment of a magnetic generator mechanism Exemplary

Referring now to exemplary FIG. 6, a third embodiment of a magnetic power generator 300 may utilize a mechanism similar to that as to the system shown in exemplary FIG. 5 and described above with the main difference that here natural permanent magnets may be used instead of neodym magnets. Because only natural permanent magnets may be used in this embodiment, only magnetic shielding material (MSM) 15 may be necessary to be applied within the separation wall 206 or the SC type II ceramic material.

As described previously, the MSM 15 may be sandwiched in two or more layers of DE material cushions 70 to absorb the impact of the moving magnets and thus produce an electric current. Sensors 216 and electric motor 214 may ensure the pulling of the separation wall 206. Again, the separation wall mechanism may be connected by ropes 220 and pulleys 202, 204.

Further, in a manner similar to as described above, the heat generated inside the compartment of the piston mechanism area could be conducted by means of a thermal fluid and conduct the heat to a vapor turbine to generate electrical power (not shown).

To lubricate the rails and therefore achieve minimum friction between the two magnets and the rail system, a lubricant material may be used. The lubricant material may be capable of repelling simple liquids like water or even complex ones like crude oils. It may be stable, maintain low contact angle hysteresis)(<2.5°, self-healing after damage, and can function at high pressures of up to 680 atm. Such lubricants are known in the art.

Figure 7:
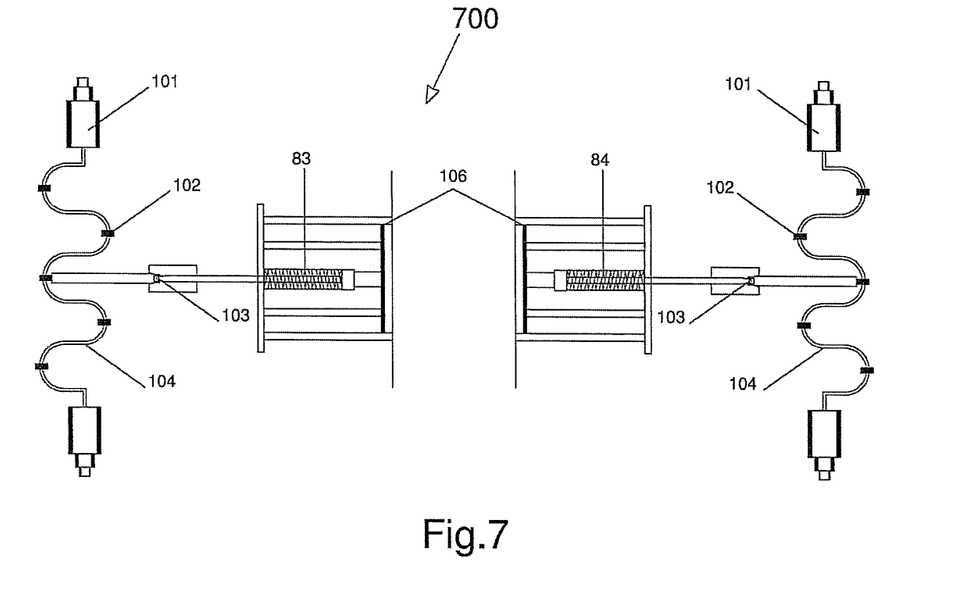
FIG. 7 shows a fourth embodiment of a magnetic generator mechanism

Now referring to exemplary FIG. 7, a fourth embodiment of a magnetic power generator 700 may utilize magnets to produce electrical power by mechanical work produced by the repulsion forces of the two oppositely placed magnets. Many components of this system may be similar to those described above, such as a separation wall, electric motor, and flywheel, and are not shown here. In this embodiment 700, at the end of pistons 106 there may be a shaft and a junction box 103 connecting the fixed solid part of the piston to a crankshaft 104 in such a way that when the pistons move forward and backward the crankshaft may create a circular movement by which a electrical current may be produced inside a stator or dynamo 101.

The magnetic repulsion forces of the magnetic fields of the two magnets may thus be used to move a conventional crankshaft 104 through a conventional flexible junction 103 in a circular and continuous movement to get the ends of the crankshaft to circulate inside a stator of a conventional dynamo or electrical generator.

Pistons 106 may then move the magnets backward in order to bring them to their initial position near one another and thus the magnetic repulsion force may once more be exerted upon them.

In one non-limiting example, a commercially available elastomer-like silicone and/or acrylic elastomer may be used, with reasonable low cost. In particular the acrylic elastomer VHB 4910, commercially available from the company 3M, which has the largest activation strain (300%), a high energy density and a high electrical breakdown strength.

In each of the described embodiments, attempts may be made to allow the system to continue running as long as possible for every unit of energy inputted. However, none of these embodiments are perpetual motion machines as friction, even if minimized, may continually slow down and eventually stop the system, requiring an external source of energy to reboot the system.

Additionally, magnetic elements generally do not degrade significantly over time. Therefore, it is envisioned that a generator using magnets may have a useful lifetime longer than generators using other methods which may degrade at a faster rate. For example, magnets may retain substantially the same amount of magnetic force over hundreds of years, compared to the faster degradation and shorter lifespans of photovoltaics and nuclear power plants.

The embodiments as described above may be applied for large devices and could be arranged in a series of devices interconnected with one another to produce the required energy needed. For example, for the generation of a large energy supply to operate different electric motors, engines or even power plants, a series-connected arrangement may be used. To assist in the design of such a structure, the following equation may be used:

$$P_{eq} = \varepsilon_0 \varepsilon_r \frac{V^2}{Z^2}$$

Where $P_{eq}$ is the equivalent electromechanical pressure, V is the voltage, $\varepsilon_0$ is the vacuum permittivity, $\varepsilon_r$ is the dielectric constant of the material, and Z is the thickness of the elastomer film/material (The equivalent electromechanical pressure $P_{eq}$ is twice the electrostatic pressure $P_{el}$).

According to at least one exemplary embodiment and referring generally to exemplary FIGS. 1-7, a magnetic generator may be disclosed. The magnetic generator may include one or more permanent magnets which may function in one or more ways in combination with a dielectric elastomer to efficiently produce electricity. Further, systems to retain excess energy for later use, such as a flywheel or a battery may be employed.

The foregoing description and accompanying figures illustrate the principles, preferred embodiments and modes of operation of the invention. However, the invention should not be construed as being limited to the particular embodiments discussed above. Additional variations of the embodiments discussed above will be appreciated by those skilled in the art.

Therefore, the above-described embodiments should be regarded as illustrative rather than restrictive. Accordingly, it should be appreciated that variations to those embodiments can be made by those skilled in the art without departing from the scope of the invention as defined by the following claims.

What is claimed is:

1. A magnetic power generator, comprising:
a first magnet having a pole movable between proximate a first position and at least one first distal position;
a second magnet having a pole movable between proximate the first position and at least one second distal position;
wherein, when the pole of the first magnet and the pole of the second magnet are proximate the first position, the poles exert a repelling force on each other, wherein work is done by at least one dielectric elastomer cushion disposed between the first magnet and the second magnet, wherein the work done is transmitted to an external battery for storage.

2. The magnetic power generator of claim 1, wherein at least one of the first magnet and the second magnet is slidably mounted on a rail.

3. The magnetic power generator of claim 1, wherein at least one of the first magnet and the second magnet is shaped as a cone.

4. The magnetic power generator of claim 1, wherein the dielectric elastomer cushion comprises: a carbon-reinforced rubber enclosure; and a plurality of layers of dielectric elastomer material disposed within the enclosure and isolated from each other by a polymer material.

5. The magnetic power generator of claim 1, wherein at least one of the first magnet and the second magnet is coupled to a spring.

6. The magnetic power generator of claim 5, further comprising a dielectric elastomer cushion disposed between at least one of the spring and the first magnet and the spring and the second magnet.

7. The magnetic power generator of claim 6, wherein the dielectric elastomer cushion comprises:
 a carbon-reinforced rubber enclosure; and
 a plurality of layers of dielectric elastomer material disposed within the enclosure, and isolated from each other by a polymer material.

8. A magnetic power generator, comprising:
 a first magnet slidable between proximate a first position and a second position;
 a first spring, coupled to the first magnet;
 a second magnet slidable between proximate the first position and a third position;
 a second spring, coupled to the second magnet;
 wherein, when the first magnet and the second magnet are proximate the first position, the magnets exert a repelling force on each other, wherein work is done by at least one dielectric elastomer cushion disposed between the first magnet and the second magnet, wherein the work done is transmitted to an external battery for storage.

9. The magnetic power generator of claim 8, wherein the dielectric elastomer cushion comprises: a carbon-reinforced rubber enclosure; and a plurality of layers of dielectric elastomer material disposed within the enclosure, and isolated from each other by a polymer material.

10. The magnetic power generator of claim 8, further comprising:
 a first dielectric elastomer cushion disposed between the spring and the first magnet; and
 a second dielectric elastomer cushion disposed between the spring and the second magnet.

11. The magnetic power generator of claim 10, wherein the dielectric elastomer cushion comprises:
 a carbon-reinforced rubber enclosure; and
 a plurality of layers of dielectric elastomer material disposed within the enclosure, and isolated from each other by a polymer material.

* * * * *